US012694223B2

(12) United States Patent
Sawal et al.

(10) Patent No.: US 12,694,223 B2
(45) Date of Patent: Jul. 28, 2026

(54) META-TAGGING BASED CONFIGURATION TRANSFORMATION FOR HETEROGENEOUS SYSTEMS

(71) Applicant: Dell Products L.P., Round Rock, TX (US)

(72) Inventors: Vinay Sawal, Fremont, CA (US);
Tsehsin Jason Liu, Wellesley, MA (US); Sumedh Sathaye, Austin, TX (US); Ching-Yun Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 18/639,737

(22) Filed: Apr. 18, 2024

(65) Prior Publication Data

US 2025/0371270 A1 Dec. 4, 2025

(51) Int. Cl.
| | |
|---|---|
| *G06F 40/30* | (2020.01) |
| *G06F 40/117* | (2020.01) |
| *G06F 40/205* | (2020.01) |

(52) U.S. Cl.
CPC ............ *G06F 40/30* (2020.01); *G06F 40/117* (2020.01); *G06F 40/205* (2020.01)

(58) Field of Classification Search
CPC ....... G06F 40/117; G06F 40/205; G06F 40/30
See application file for complete search history.

(56) References Cited

U.S. PATENT DOCUMENTS

| | | | |
|---|---|---|---|
| 7,080,058 | B1 | 7/2006 | Upadhyayula et al. |
| 8,626,481 | B1 | 1/2014 | Sundararajan et al. |
| 10,922,423 | B1 | 2/2021 | Rungta et al. |
| 10,944,561 | B1 | 3/2021 | Cahill et al. |
| 11,023,598 | B2 | 6/2021 | Grand |
| 11,108,780 | B2 | 8/2021 | Cohen |

(Continued)

OTHER PUBLICATIONS

Office Action mailed Apr. 14, 2025 for U.S. Appl. No. 17/932,905, 52 pages.

(Continued)

*Primary Examiner* — Eric Yen

(74) *Attorney, Agent, or Firm* — Amin, Turocy & Watson, LLP

(57) ABSTRACT

A system can identify respective computer function terms utilized by respective vendor equipment of computer function vendors; tag the respective computer function terms in a latent space based on natural language processing, to produce respective clusters; associate respective metatags with the respective clusters based on respective semantic meanings; receive a request to perform a computer function, wherein the request comprises a generic term; identify hardware with which to perform the computer function based on the respective metatags; identify equipment of a computer function vendor, of the vendor equipment of the respective computer function vendors, which corresponds to the hardware; based on the respective metatags and respective clusters, identify a computer function term of the respective computer function terms used by the equipment of the computer function vendor, wherein the computer function term corresponds to the generic term; and carry out the request using the hardware with the computer function term.

20 Claims, 12 Drawing Sheets

(56) References Cited

U.S. PATENT DOCUMENTS

| | | | |
|---|---|---|---|
| 11,379,275 | B2 | 7/2022 | Milliron et al. |
| 12,061,880 | B2 * | 8/2024 | Chen ..................... G06F 40/284 |
| 2005/0021977 | A1 | 1/2005 | Oberst |
| 2007/0239397 | A1 | 10/2007 | Bourne et al. |
| 2007/0289024 | A1 | 12/2007 | Mohammed |
| 2015/0379061 | A1 | 12/2015 | Paraschivescu |
| 2016/0072814 | A1 | 3/2016 | Martinelli |
| 2018/0349797 | A1 | 12/2018 | Garvey et al. |
| 2020/0081992 | A1 * | 3/2020 | Lynch ............... G06F 16/24578 |
| 2021/0084048 | A1 | 3/2021 | Kannan et al. |
| 2021/0216053 | A1 | 7/2021 | Boelk |
| 2022/0093091 | A1 * | 3/2022 | Kwatra ................... G10L 25/63 |
| 2022/0207096 | A1 * | 6/2022 | Salazar ................... G06F 40/30 |
| 2022/0223143 | A1 * | 7/2022 | Kumar .................... G10L 15/02 |
| 2023/0086475 | A1 | 3/2023 | Mosko |
| 2023/0192139 | A1 | 6/2023 | Kumavat et al. |
| 2023/0401332 | A1 | 12/2023 | Vahidnia et al. |
| 2024/0179181 | A1 | 5/2024 | Torlak et al. |
| 2024/0179182 | A1 | 5/2024 | Hicks et al. |
| 2024/0179188 | A1 | 5/2024 | Torlak et al. |
| 2024/0249008 | A1 | 7/2024 | Inokuchi et al. |
| 2025/0202903 | A1 | 6/2025 | Fry et al. |

OTHER PUBLICATIONS

Notice of Allowance mailed Apr. 10, 2025 for U.S. Appl. No. 18/331,770, 36 pages.

Notice of Allowance mailed Apr. 8, 2025 for U.S. Appl. No. 18/364,939, 44 pages.

Office Action mailed May 29, 2025 for U.S. Appl. No. 18/627,118, 24 pages.

Chao, Ching-Yun. "Software Services with Declarative Resource Modeling and Resource Model Patterns" U.S. Appl. No. 18/048,669, filed Oct. 21, 2022, 47 pages.

Chao, et al. "Scalable Access Control Mechanism" U.S. Appl. No. 17/932,905, filed Sep. 16, 2022, 51 pages.

Hu, et al. "Guide to Attribute Based Access Control (ABAC) Definition and Considerations" NIST Special Publication 800-162 [https://doi.org/10.6028/NIST.SP.800-162], Jan. 2014, 47 pages.

Ferraiolo, et al., "Extensible Access Control Markup Language (XACML) and Next Generation Access Control (NGAC)," ABAC '16: Proceedings of the 2016 ACM International Workshop on Attribute Based Access Control, Mar. 2016, 12 pages.

Ferraiolo, et al., "A Comparison of Attribute Based Access Control (ABAC) Standards for Data Service Applications" NIST SP 800-178, [http://dx.doi.org/10.6028/NIST.SP.800-178], Oct. 2016, 68 pages.

"Dell EMC OpenManage EnterpriseSupportAssist Version 1.1" [https://dl.dell.com/topicspdf/openmanage-enterprise-supportassist_users-guide2_en-us.pdf], Jun. 2021, 65 pages.

"Scopes" [https://auth0.com/docs/get-started/apis/scopes] retrieved Nov. 3, 2023, 4 pages.

"Cortex XDR Pro Administrator Guide" [https://docs.paloaltonetworks.com/content/dam/techdocs/en_US/pdf/cortex/cortex-xdr/cortex-xdr-pro-admin/cortex-xdr-pro-admin.pdf/cortex-xdr-pro-admin.pdf], retreived Nov. 3, 2023, 776 pages.

"Attribute Based Access Control" National Institute of Standards and Technology, [https://www.nccoe.nist.gov/sites/default/files/legacy-files/abac-fact-sheet.pdf], Sep. 2017, 2 pages.

"Hierarchical and recursive queries in SQL" Wikipedia. [https://en.wikipedia.org/wiki/Hierarchical_and_recursive_queries_in_SQL#Common_table_expression], retrieved Nov. 30, 2023, 5 pages.

Kivimaki, Petteri. "AWS, Azure, GCP: Resource Hierarchies" [https://levelup.gitconnected.com/aws-azure-gcp-resource-hierarchies-25b829127511] Feb. 9, 2020, 15 pages.

"Hierarchical Data in SQL: The Ultimate Guide" [https://www.databasestar.com/hierarchical-data-sql/] Jun. 2, 2023, 21 pages.

"What are the options for storing hierarchical data in a relational database?" [https://stackoverflow.com/questions/4048151/what-are-the-options-for-storing-hierarchical-data-in-a-relational-database], retrieved Nov. 3, 2023, 11 pages.

Monge, Alvaro. "Database design with UML and SQL, 4th edition" [https://web.csulb.edu/colleges/coe/cecs/dbdesign/dbdesign.php?page=intro.html], retrieved Nov. 3, 2023, 2 pages.

Fang, et al. "Attribute-Based Access Control Using Scoped Roles and Conditioned Permissions Dynamic Policies" U.S. Appl. No. 18/331,770, filed Jun. 8, 2023, 47 pages.

"Jabbar et al. ""Dynamic Visibility and Authorization Policymanagement for a Cloud Service Platform"" U.S. Appl. No. 18/350,149, filed Jul. 11, 2023, 59 pages."

"ACME Laboratories" [https://www.acme.com/], retrieved Dec. 1, 2023, 2 pages.

"Azure Policy definition structure" [https://learn.microsoft.com/en-us/azure/governance/policy/concepts/definition-structure], Aug. 15, 2023, 34 pages.

"Azure policyRule schema" [https://schema.management.azure.com/schemas/2020-10-01/policyDefinition.json], retrieved Dec. 1, 2023, 2 pages.

"Policy-based control for cloud native environments" Open Policy Agent. [https://www.openpolicyagent.org/], retrieved Dec. 1, 2023, 6 pages.

Goyal, et al. "Authorization Decisions Using Conditioned Permissions for Resource Collections" U.S. Appl. No. 18/364,939, filed Aug. 3, 2023, 53 pages.

Sathaye, et al. "Self-Tagging", U.S. Appl. No. 18/627,118, filed Apr. 4, 2024, 43 pages.

Chao, et al. "Policy-Based Tagging Governance for Cloud Resource Lifecycle Management" U.S. Appl. No. 18/639,707, filed Apr. 18, 2024, 47 pages.

Courcelle, Bruno. "Graph equivalences and decompositions definable in Monadic Second-Order Logic. The case of Circle Graphs" presented at Proc. of ICDM, Jul. 24, 2006, 15 pages.

Thomas, Wolfgang. "Languages, Automata, and Logic" May 1996, In Handbook of Formal Languages, vol. 3: Beyond Words. New York NY: Springer-Verlag, 75 pages.

Office Action mailed Dec. 5, 2023 for U.S. Appl. No. 18/048,669, 27 pages.

Notice of Allowance mailed May 13, 2024 for U.S. Appl. No. 18/048,669, 33 pages.

Dasika, et al. "Data Center Monitoring and Management Operation Including a Data Tag Association Tracking Operation" U.S. Appl. No. 18/374,225, filed Sep. 28, 2023, 66 pages.

Guertin, et al. "Data Center Monitoring and Management Operation Including a Data Tag Management Operation" U.S. Appl. No. 18/241,030, filed Aug. 31, 2023, 73 pages.

Realegeno, et al. "User-Configurable Autotagging Policies" U.S. Appl. No. 18/241,040, filed Aug. 31, 2023, 71 pages.

Earley, et al. "Data Center Monitoring and Management Operation Including a Protected Data Tag Operation" U.S. Appl. No. 18/374,230, filed Sep. 28, 2023, 68 pages.

Sathaye, et al. "System and Methods for Dynamic Tags", U.S. Appl. No. 18/374,231, filed Sep. 28, 2023, 66 pages.

Notice of Allowance mailed Aug. 19, 2025 for U.S. Appl. No. 17/932,905, 66 pages.

Office Action mailed Dec. 1, 2025 for U.S. Appl. No. 18/627,118, 39 pages.

Notice of Allowance mailed Apr. 14, 2026 for U.S. Appl. No. 18/627,118, 39 pages.

* cited by examiner

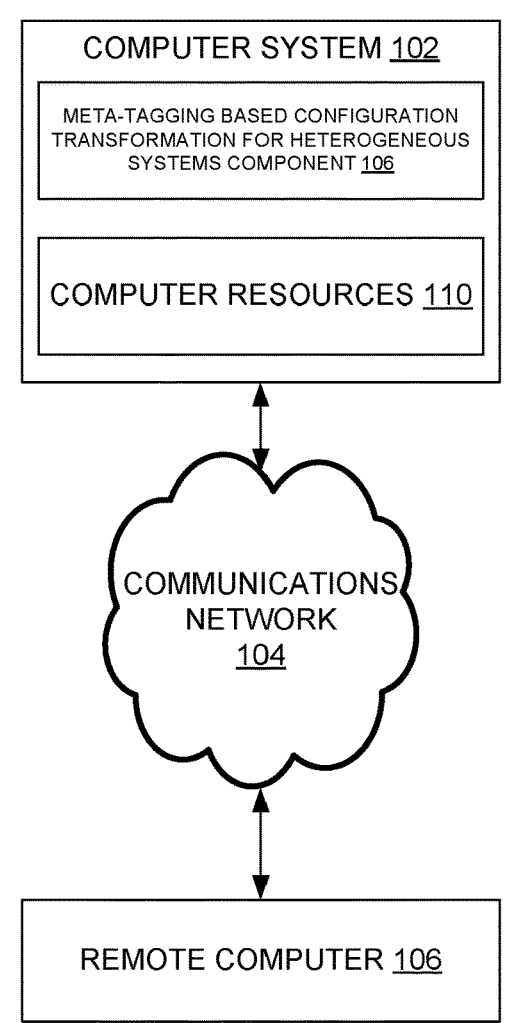
FIG. 1

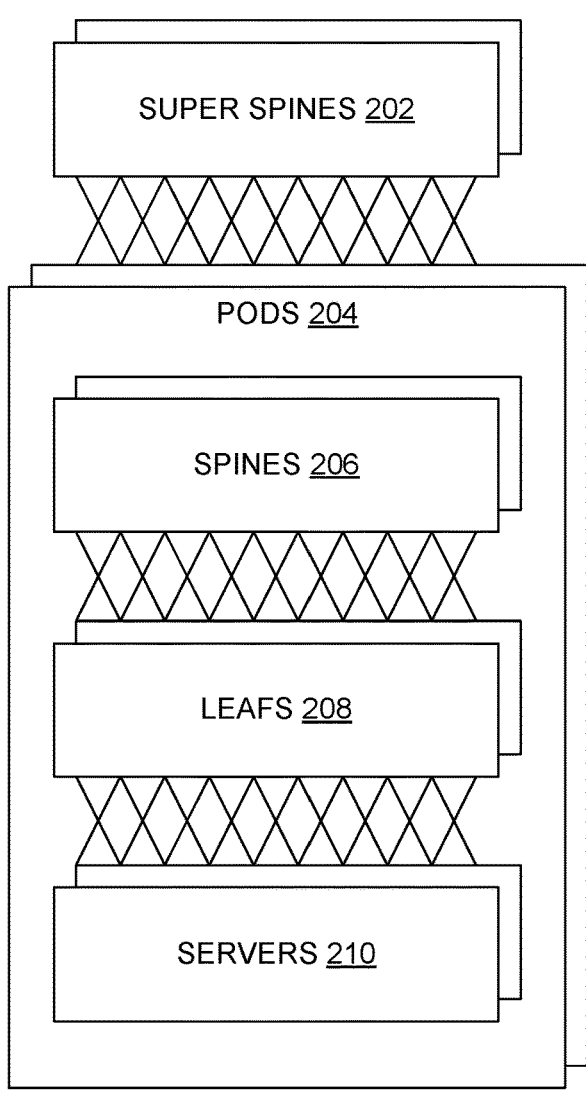
FIG. 2

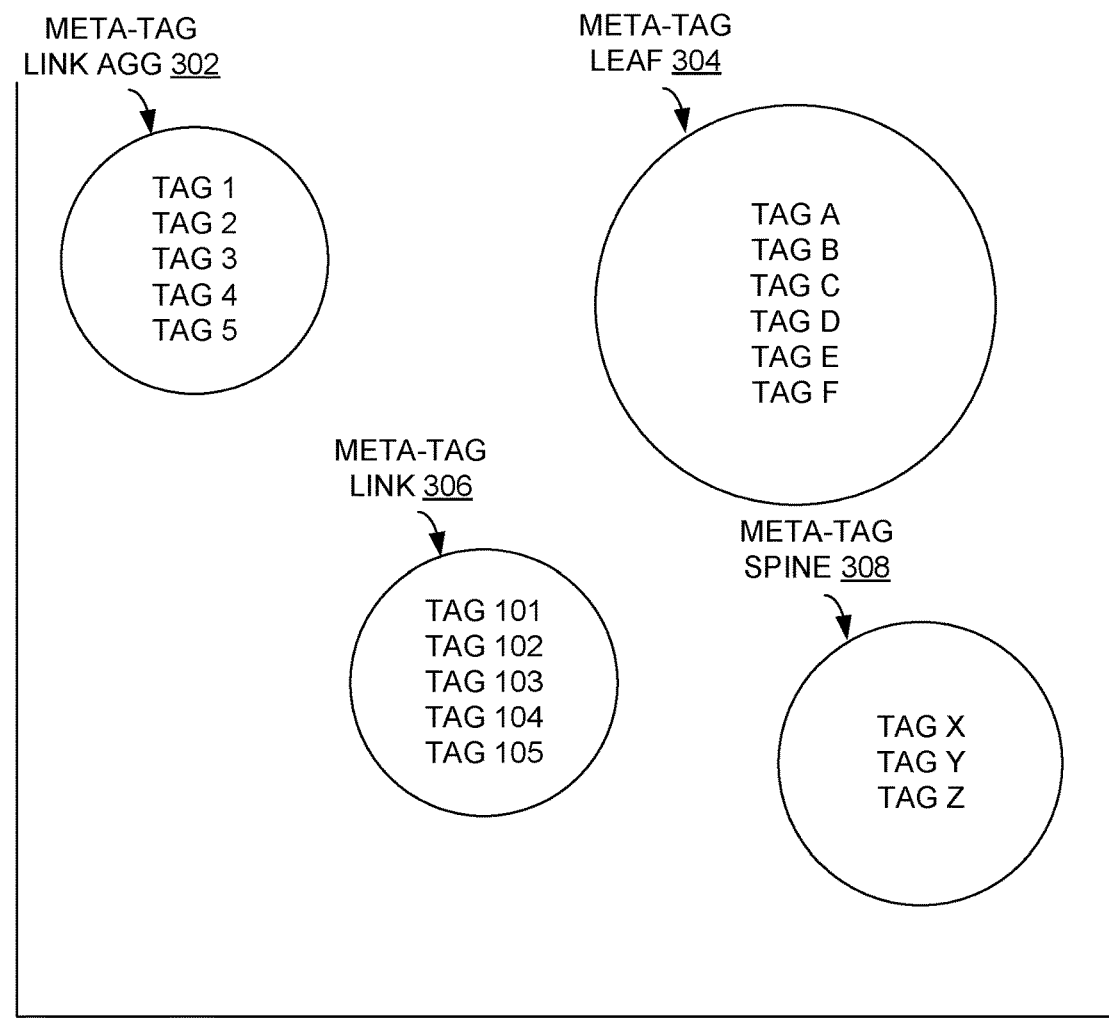
300
META-TAGGING BASED
CONFIGURATION TRANSFORMATION
FOR HETEROGENEOUS SYSTEMS
COMPONENT 310
META-TAG
LINK AGG 302
TAG 1
TAG 2
TAG 3
TAG 4
TAG 5
META-TAG
LEAF 304
TAG A
TAG B
TAG C
TAG D
TAG E
TAG F
META-TAG
LINK 306
TAG 101
TAG 102
TAG 103
TAG 104
TAG 105
META-TAG
SPINE 308
TAG X
TAG Y
TAG Z
FIG. 3

400
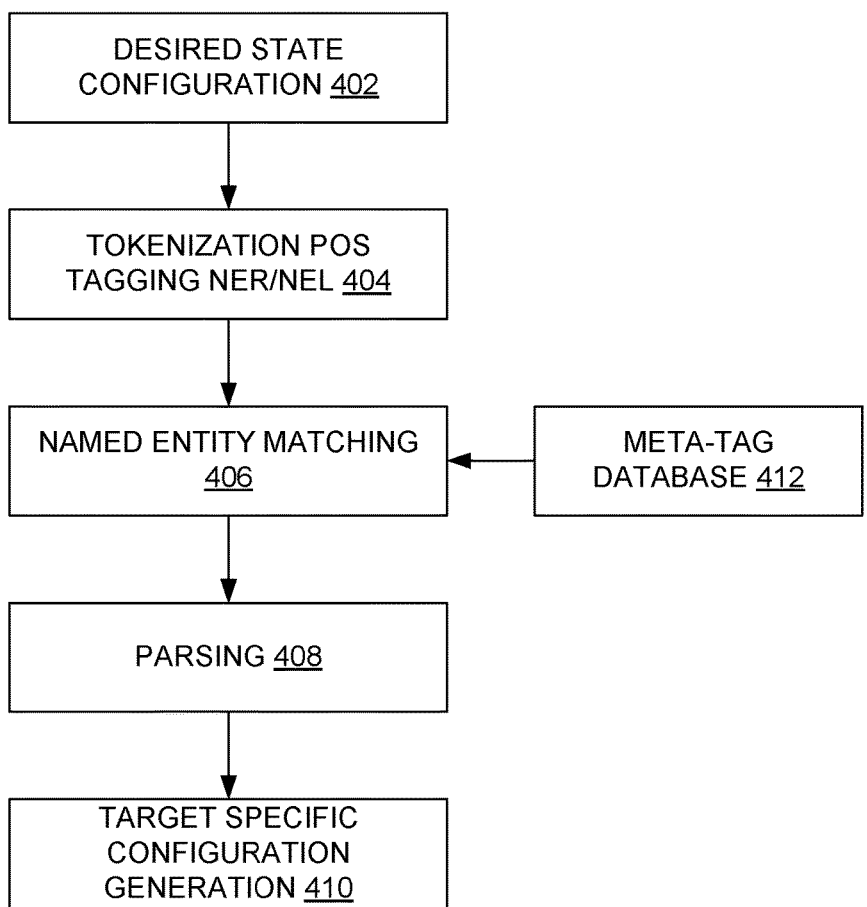
META-TAGGING BASED
CONFIGURATION TRANSFORMATION
FOR HETEROGENEOUS SYSTEMS
COMPONENT 414
DESIRED STATE
CONFIGURATION 402
TOKENIZATION POS
TAGGING NER/NEL 404
NAMED ENTITY MATCHING
406
META-TAG
DATABASE 412
PARSING 408
TARGET SPECIFIC
CONFIGURATION
GENERATION 410
FIG. 4

500

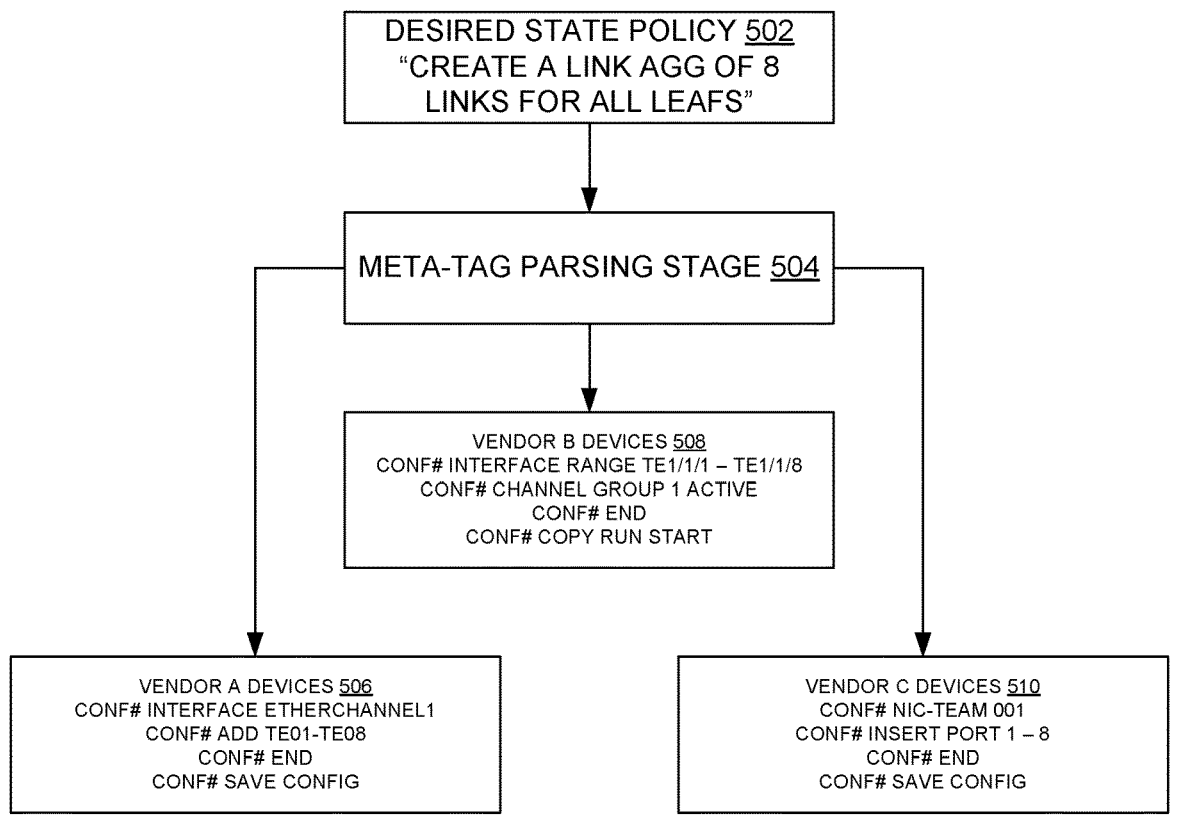

META-TAGGING BASED
CONFIGURATION TRANSFORMATION
FOR HETEROGENEOUS SYSTEMS
COMPONENT 512

DESIRED STATE POLICY 502
"CREATE A LINK AGG OF 8
LINKS FOR ALL LEAFS"

META-TAG PARSING STAGE 504

VENDOR B DEVICES 508
CONF# INTERFACE RANGE TE1/1/1 – TE1/1/8
CONF# CHANNEL GROUP 1 ACTIVE
CONF# END
CONF# COPY RUN START

VENDOR A DEVICES 506
CONF# INTERFACE ETHERCHANNEL1
CONF# ADD TE01-TE08
CONF# END
CONF# SAVE CONFIG

VENDOR C DEVICES 510
CONF# NIC-TEAM 001
CONF# INSERT PORT 1 – 8
CONF# END
CONF# SAVE CONFIG

FIG. 5

600

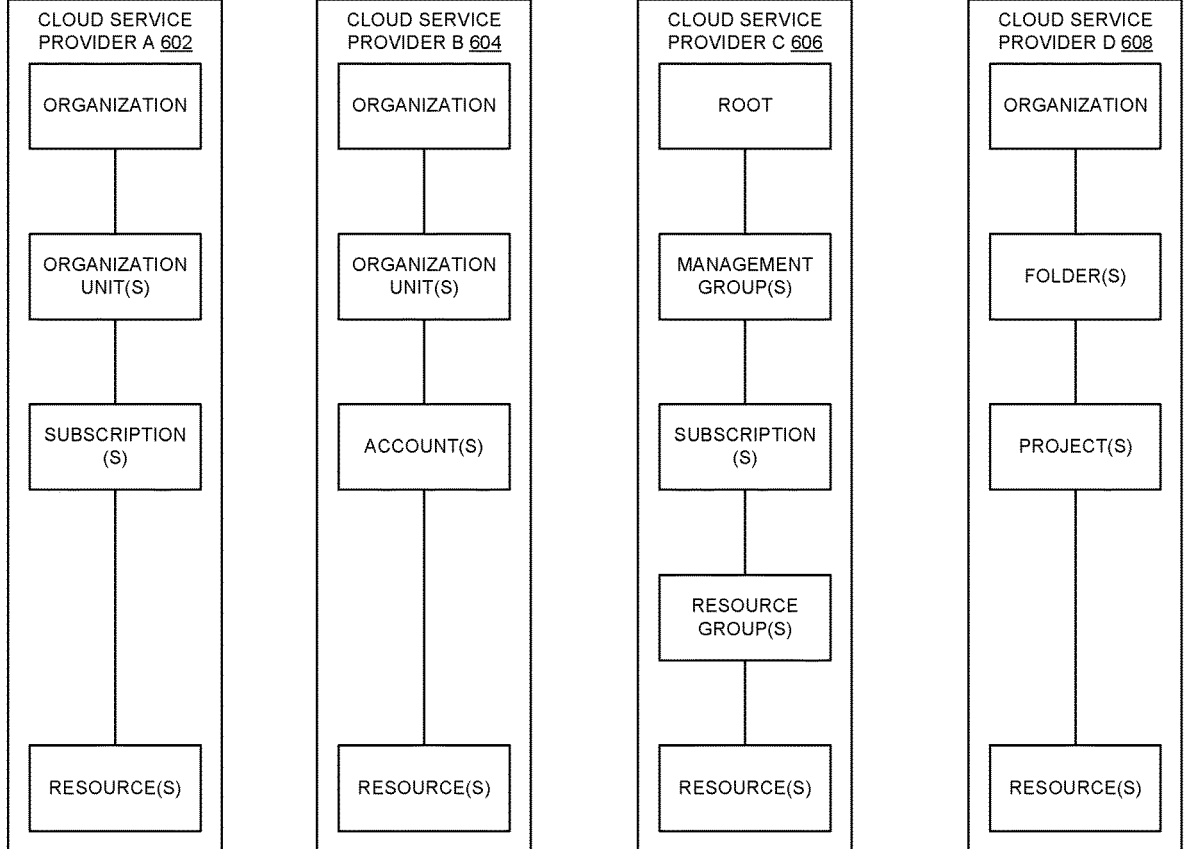

META-TAGGING BASED
CONFIGURATION TRANSFORMATION
FOR HETEROGENEOUS SYSTEMS
COMPONENT 612

CLOUD SERVICE PROVIDER A 602

ORGANIZATION

ORGANIZATION UNIT(S)

SUBSCRIPTION (S)

RESOURCE(S)

CLOUD SERVICE PROVIDER B 604

ORGANIZATION

ORGANIZATION UNIT(S)

ACCOUNT(S)

RESOURCE(S)

CLOUD SERVICE PROVIDER C 606

ROOT

MANAGEMENT GROUP(S)

SUBSCRIPTION (S)

RESOURCE GROUP(S)

RESOURCE(S)

CLOUD SERVICE PROVIDER D 608

ORGANIZATION

FOLDER(S)

PROJECT(S)

RESOURCE(S)

Figure 7:
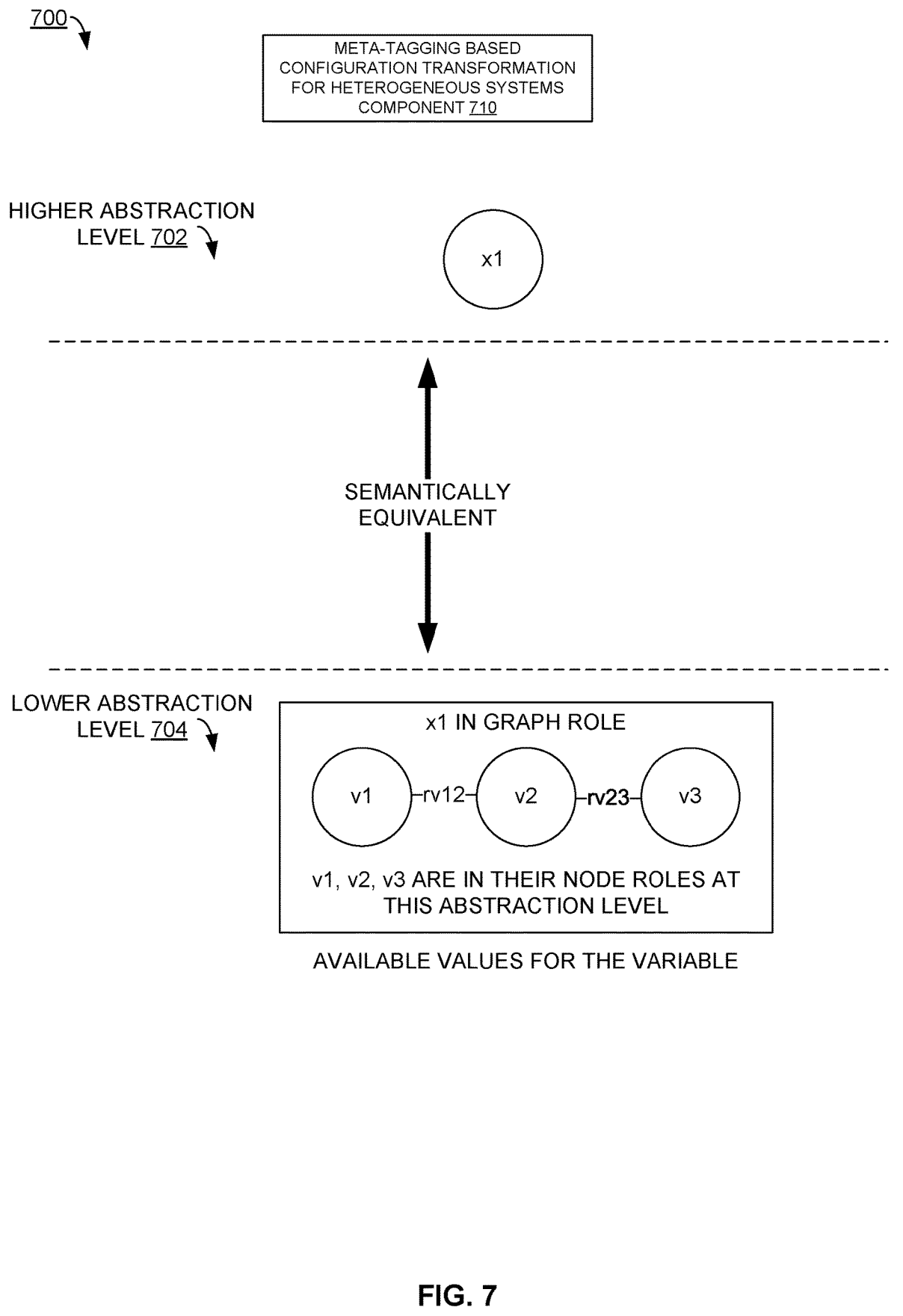

META-TAGGING BASED
CONFIGURATION TRANSFORMATION
FOR HETEROGENEOUS SYSTEMS
COMPONENT 710

HIGHER ABSTRACTION
LEVEL 702 x1

SEMANTICALLY
EQUIVALENT

LOWER ABSTRACTION
LEVEL 704 x1 IN GRAPH ROLE v1 —rv12— v2 —rv23— v3 v1, v2, v3 ARE IN THEIR NODE ROLES AT
THIS ABSTRACTION LEVEL

AVAILABLE VALUES FOR THE VARIABLE

Figure 9:
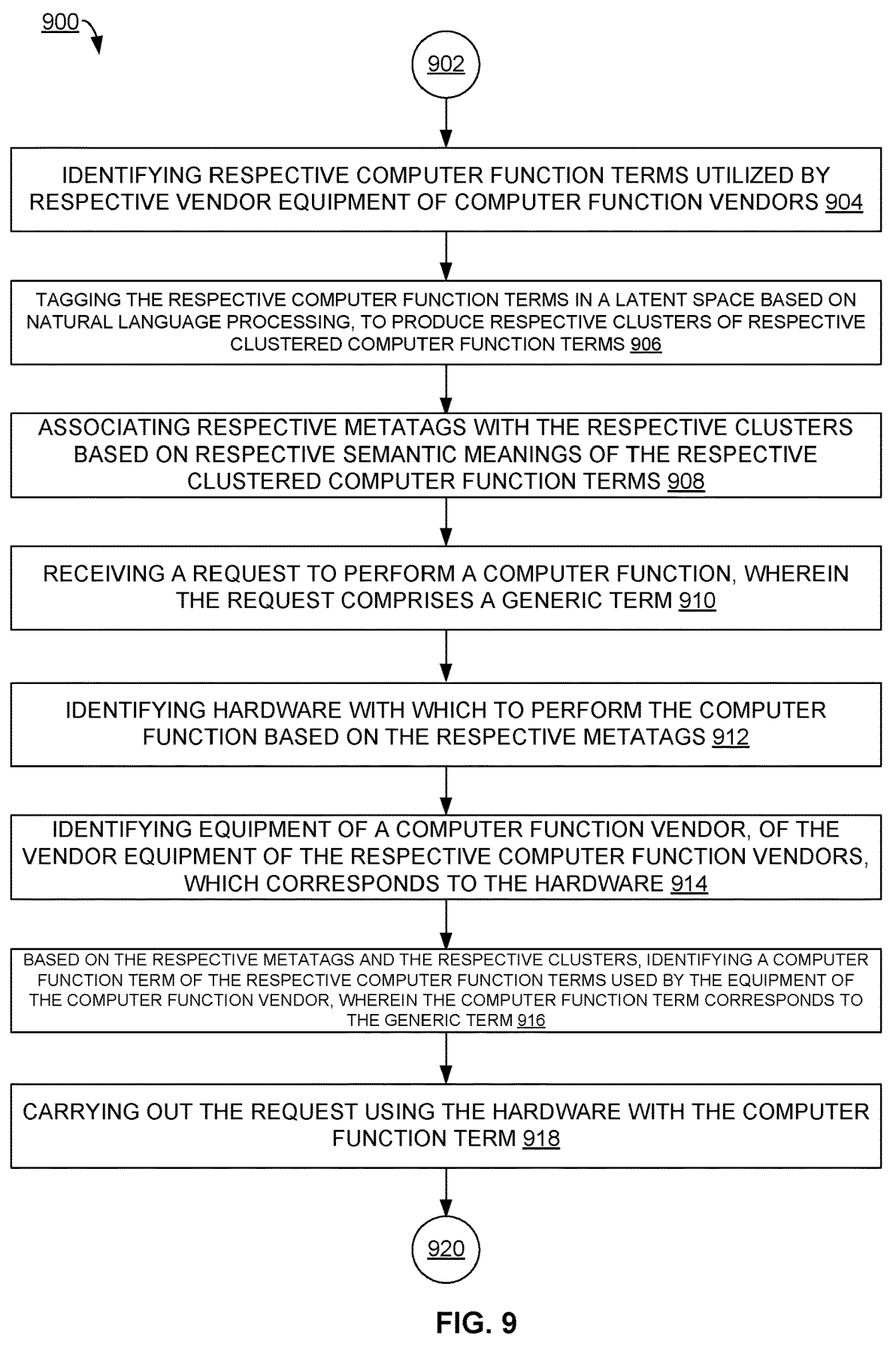

IDENTIFYING RESPECTIVE COMPUTER FUNCTION TERMS UTILIZED BY RESPECTIVE VENDOR EQUIPMENT OF COMPUTER FUNCTION VENDORS 904

TAGGING THE RESPECTIVE COMPUTER FUNCTION TERMS IN A LATENT SPACE BASED ON NATURAL LANGUAGE PROCESSING, TO PRODUCE RESPECTIVE CLUSTERS OF RESPECTIVE CLUSTERED COMPUTER FUNCTION TERMS 906

ASSOCIATING RESPECTIVE METATAGS WITH THE RESPECTIVE CLUSTERS BASED ON RESPECTIVE SEMANTIC MEANINGS OF THE RESPECTIVE CLUSTERED COMPUTER FUNCTION TERMS 908

RECEIVING A REQUEST TO PERFORM A COMPUTER FUNCTION, WHEREIN THE REQUEST COMPRISES A GENERIC TERM 910

IDENTIFYING HARDWARE WITH WHICH TO PERFORM THE COMPUTER FUNCTION BASED ON THE RESPECTIVE METATAGS 912

IDENTIFYING EQUIPMENT OF A COMPUTER FUNCTION VENDOR, OF THE VENDOR EQUIPMENT OF THE RESPECTIVE COMPUTER FUNCTION VENDORS, WHICH CORRESPONDS TO THE HARDWARE 914

BASED ON THE RESPECTIVE METATAGS AND THE RESPECTIVE CLUSTERS, IDENTIFYING A COMPUTER FUNCTION TERM OF THE RESPECTIVE COMPUTER FUNCTION TERMS USED BY THE EQUIPMENT OF THE COMPUTER FUNCTION VENDOR, WHEREIN THE COMPUTER FUNCTION TERM CORRESPONDS TO THE GENERIC TERM 916

CARRYING OUT THE REQUEST USING THE HARDWARE WITH THE COMPUTER FUNCTION TERM 918

Figure 10:
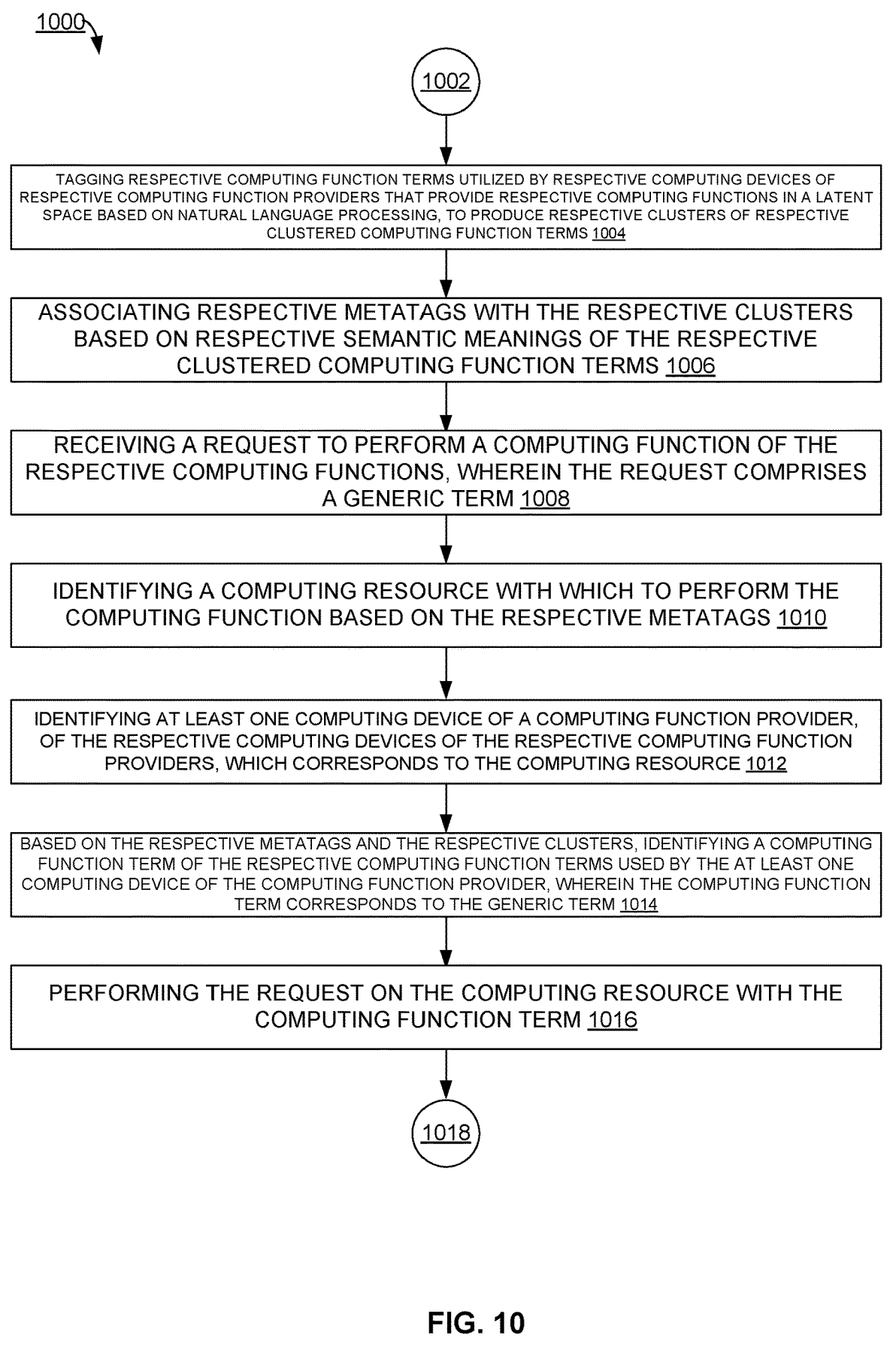

TAGGING RESPECTIVE COMPUTING FUNCTION TERMS UTILIZED BY RESPECTIVE COMPUTING DEVICES OF RESPECTIVE COMPUTING FUNCTION PROVIDERS THAT PROVIDE RESPECTIVE COMPUTING FUNCTIONS IN A LATENT SPACE BASED ON NATURAL LANGUAGE PROCESSING, TO PRODUCE RESPECTIVE CLUSTERS OF RESPECTIVE CLUSTERED COMPUTING FUNCTION TERMS 1004

ASSOCIATING RESPECTIVE METATAGS WITH THE RESPECTIVE CLUSTERS BASED ON RESPECTIVE SEMANTIC MEANINGS OF THE RESPECTIVE CLUSTERED COMPUTING FUNCTION TERMS 1006

RECEIVING A REQUEST TO PERFORM A COMPUTING FUNCTION OF THE RESPECTIVE COMPUTING FUNCTIONS, WHEREIN THE REQUEST COMPRISES A GENERIC TERM 1008

IDENTIFYING A COMPUTING RESOURCE WITH WHICH TO PERFORM THE COMPUTING FUNCTION BASED ON THE RESPECTIVE METATAGS 1010

IDENTIFYING AT LEAST ONE COMPUTING DEVICE OF A COMPUTING FUNCTION PROVIDER, OF THE RESPECTIVE COMPUTING DEVICES OF THE RESPECTIVE COMPUTING FUNCTION PROVIDERS, WHICH CORRESPONDS TO THE COMPUTING RESOURCE 1012

BASED ON THE RESPECTIVE METATAGS AND THE RESPECTIVE CLUSTERS, IDENTIFYING A COMPUTING FUNCTION TERM OF THE RESPECTIVE COMPUTING FUNCTION TERMS USED BY THE AT LEAST ONE COMPUTING DEVICE OF THE COMPUTING FUNCTION PROVIDER, WHEREIN THE COMPUTING FUNCTION TERM CORRESPONDS TO THE GENERIC TERM 1014

PERFORMING THE REQUEST ON THE COMPUTING RESOURCE WITH THE COMPUTING FUNCTION TERM 1016

Figure 11:
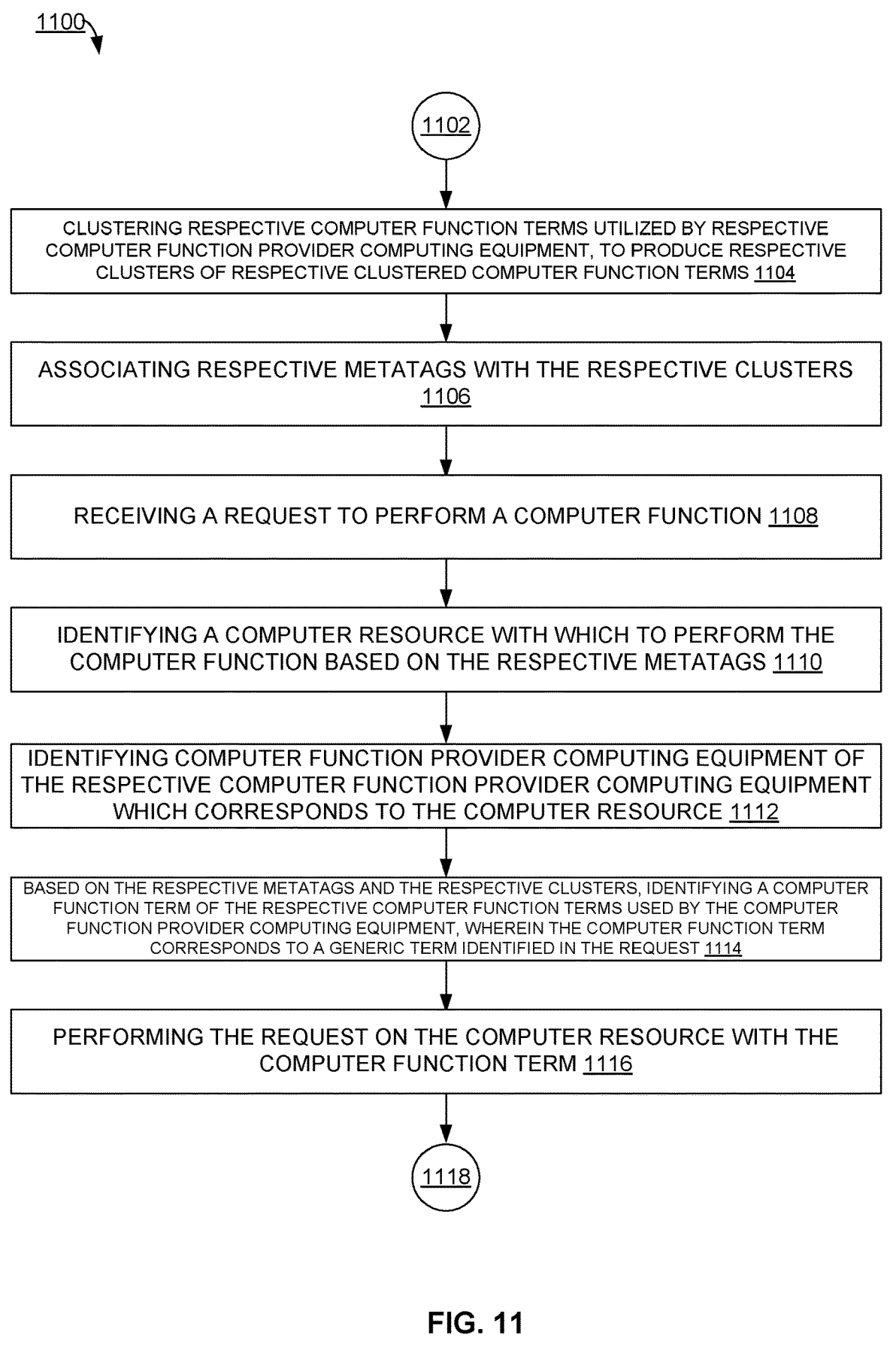

CLUSTERING RESPECTIVE COMPUTER FUNCTION TERMS UTILIZED BY RESPECTIVE COMPUTER FUNCTION PROVIDER COMPUTING EQUIPMENT, TO PRODUCE RESPECTIVE CLUSTERS OF RESPECTIVE CLUSTERED COMPUTER FUNCTION TERMS 1104

ASSOCIATING RESPECTIVE METATAGS WITH THE RESPECTIVE CLUSTERS 1106

RECEIVING A REQUEST TO PERFORM A COMPUTER FUNCTION 1108

IDENTIFYING A COMPUTER RESOURCE WITH WHICH TO PERFORM THE COMPUTER FUNCTION BASED ON THE RESPECTIVE METATAGS 1110

IDENTIFYING COMPUTER FUNCTION PROVIDER COMPUTING EQUIPMENT OF THE RESPECTIVE COMPUTER FUNCTION PROVIDER COMPUTING EQUIPMENT WHICH CORRESPONDS TO THE COMPUTER RESOURCE 1112

BASED ON THE RESPECTIVE METATAGS AND THE RESPECTIVE CLUSTERS, IDENTIFYING A COMPUTER FUNCTION TERM OF THE RESPECTIVE COMPUTER FUNCTION TERMS USED BY THE COMPUTER FUNCTION PROVIDER COMPUTING EQUIPMENT, WHEREIN THE COMPUTER FUNCTION TERM CORRESPONDS TO A GENERIC TERM IDENTIFIED IN THE REQUEST 1114

PERFORMING THE REQUEST ON THE COMPUTER RESOURCE WITH THE COMPUTER FUNCTION TERM 1116

META-TAGGING BASED CONFIGURATION TRANSFORMATION FOR HETEROGENEOUS SYSTEMS

BACKGROUND

A cloud computing deployment can comprise components from multiple vendors.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify respective computer function terms utilized by respective vendor equipment of computer function vendors. The system can tag the respective computer function terms in a latent space based on natural language processing, to produce respective clusters of respective clustered computer function terms. The system can associate respective metatags with the respective clusters based on respective semantic meanings of the respective clustered computer function terms. The system can receive a request to perform a computer function, wherein the request comprises a generic term. The system can identify hardware with which to perform the computer function based on the respective metatags. The system can identify equipment of a computer function vendor, of the vendor equipment of the respective computer function vendors, which corresponds to the hardware. The system can, based on the respective metatags and the respective clusters, identify a computer function term of the respective computer function terms used by the equipment of the computer function vendor, wherein the computer function term corresponds to the generic term. The system can carry out the request using the hardware with the computer function term.

An example method can comprise tagging, by a system comprising at least one processor, respective computing function terms utilized by respective computing devices of respective computing function providers that provide respective computing functions in a latent space based on natural language processing, to produce respective clusters of respective clustered computing function terms. The method can further comprise associating, by the system, respective metatags with the respective clusters based on respective semantic meanings of the respective clustered computing function terms. The method can further comprise receiving, by the system, a request to perform a computing function of the respective computing functions, wherein the request comprises a generic term. The method can further comprise identifying, by the system, a computing resource with which to perform the computing function based on the respective metatags. The method can further comprise identifying, by the system, at least one computing device of a computing function provider, of the respective computing devices of the respective computing function providers, which corresponds to the computing resource. The method can further comprise, based on the respective metatags and the respective clusters, identifying, by the system, a computing function term of the respective computing function terms used by the at least one computing device of the computing function provider, wherein the computing function term corresponds to the generic term. The method can further comprise performing, by the system, the request on the computing resource with the computing function term.

An example non-transitory computer-readable medium can comprise instructions that, in response to execution, cause a system comprising a processor to perform operations. These operations can comprise clustering respective computer function terms utilized by respective computer function provider computing equipment, to produce respective clusters of respective clustered computer function terms. These operations can further comprise associating respective metatags with the respective clusters. These operations can further comprise receiving a request to perform a computer function. These operations can further comprise identifying a computer resource with which to perform the computer function based on the respective metatags. These operations can further comprise identifying computer function provider computing equipment of the respective computer function provider computing equipment that corresponds to the computer resource. These operations can further comprise, based on the respective metatags and the respective clusters, identifying a computer function term of the respective computer function terms used by the computer function provider computing equipment, wherein the computer function term corresponds to a generic term identified in the request. These operations can further comprise performing the request on the computer resource with the computer function term.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate meta-tagging based configuration transformation for heterogeneous systems, in accordance with an embodiment of this disclosure;

FIG. 2 illustrates another example system architecture that can facilitate meta-tagging based configuration transformation for heterogeneous systems, in accordance with an embodiment of this disclosure;

FIG. 3 illustrates an example of meta-tags that can facilitate meta-tagging based configuration transformation for heterogeneous systems, in accordance with an embodiment of this disclosure;

FIG. 4 illustrates an example system architecture of a meta-tag based configuration transformation, and that can facilitate meta-tagging based configuration transformation for heterogeneous systems, in accordance with an embodiment of this disclosure;

FIG. 5 illustrates an example process flow of a meta-tag based configuration transformation, and that can facilitate meta-tagging based configuration transformation for heterogeneous systems, in accordance with an embodiment of this disclosure;

FIG. 6 illustrates an example of cloud platform constructs, and that can facilitate meta-tagging based configuration transformation for heterogeneous systems, in accordance with an embodiment of this disclosure;

FIG. 7 illustrates an example of abstraction levels, and that can facilitate meta-tagging based configuration transformation for heterogeneous systems, in accordance with an embodiment of this disclosure;

FIG. 9 illustrates an example process flow that can facilitate meta-tagging based configuration transformation for heterogeneous systems, in accordance with an embodiment of this disclosure;

FIG. 10 illustrates another example process flow that can facilitate meta-tagging based configuration transformation for heterogeneous systems, in accordance with an embodiment of this disclosure;

FIG. 11 illustrates another example process flow that can facilitate meta-tagging based configuration transformation for heterogeneous systems, in accordance with an embodiment of this disclosure;

DETAILED DESCRIPTION

Overview

Figure 8:
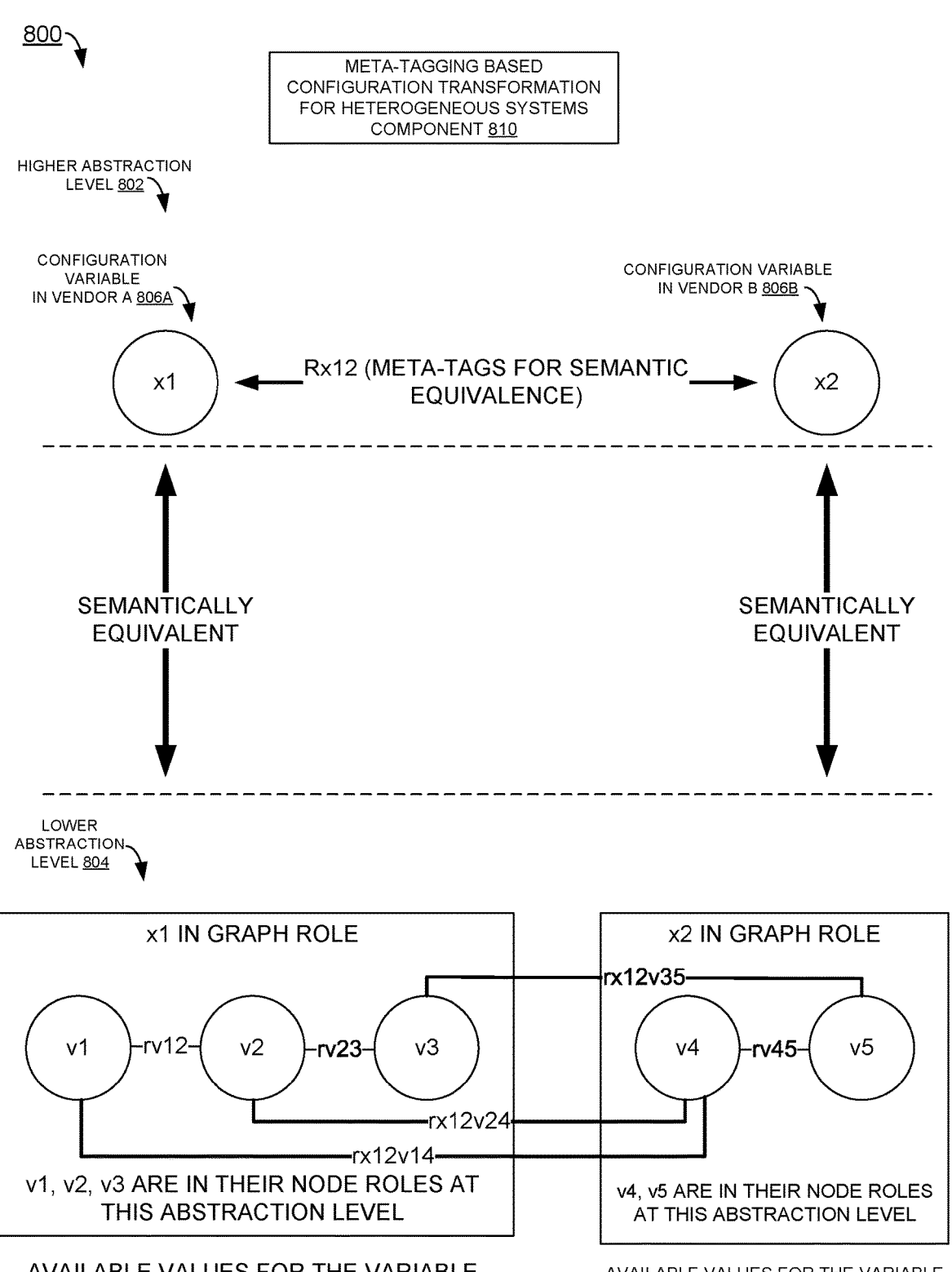
FIG. 8 illustrates another example of abstraction levels, and that can facilitate meta-tagging based configuration transformation for heterogeneous systems, in accordance with an embodiment of this disclosure.

A cloud deployment can comprise heterogeneous vendor equipment that requires provisioning and other lifecycle management activities. Cloud admins/operators can utilize vendor-specific configuration models and methodology to provision these devices. For example, consider the following network fabric with spines and leaves. The network elements can come from multiple different vendors. Each vendor can have its own terminology to describe seemingly similar network functions. For instance, a network function of physically bundling switch ports and/or interfaces into a logical interface can be referred to by different names by different vendors.

When a network fabric orchestrator configures such a heterogeneous infrastructure, vendor-specific configuration files with device-specific terminology can be developed to provision the fabric. It can be beneficial if there is an approach that can abstract out the network-function commonality from the device-specific configurations to create a higher-level and vendor-agnostic configuration. Using this approach, a job of a network fabric orchestrator can be simplified, and vendor-specific/device-specific configuration can be isolated to a lowest level (or lower level) of a configuration stack.

To address this problem, the present techniques can be implemented to facilitate a meta-tagging technique where similar network function terms are clustered using a meta-tag, enabling an operator to create a single configuration policy file to provision heterogeneous devices in a vendor-agnostic fashion. This approach can move a provisioning methodology from an imperative ("how") approach to a declarative ("what") approach. Vendor-specific details can be isolated to a driver level, thus abstracting details from the operator.

Continuing the example presented earlier, network functions can be tagged in a latent space using a natural language processing (NLP) technique. Meta-tags can identify semantically similar terms and phrases together. For a given entity, multiple meta-tags can be assigned. This information can be used in a step of parsing the desired state configuration and generating a target-specific configuration.

The present techniques can be implemented to facilitate a knowledge graph (KG) based meta-tagging capability that abstracts the vendor-specific configuration details to create a vendor-agnostic configuration, thus enabling seamless policy enforcement to a heterogeneous deployment. The present techniques can be implemented to facilitate a use of meta-tagging functionality for abstracting vendor-specific details, and presenting a uniform configuration interface for a better user experience.

Prior approaches can involve generating a vendor-specific device configuration based on the desired state policy. This approach is not scalable for a large heterogeneous deployment. Prior approaches lack using monadic second-order logic-based knowledge graphs to create such a solution in a cloud configuration space. Monadic second order (MSO) logic can generally comprise an extension of first order (FO) logic by allowing quantified variables denoting set of elements. Modular decomposition can establish structure properties describing a partial order of decomposition graphs.

Example Architectures, Etc.

FIG. 1 illustrates an example system architecture 100 that can facilitate meta-tagging based configuration transformation for heterogeneous systems, in accordance with an embodiment of this disclosure.

System architecture 100 comprises computer system 102, communications network 104, and remote computer 106. In turn, computer system 102 comprises meta-tagging based configuration transformation for heterogeneous systems component 108 and computer resources 110.

System architecture 100 presents one logical example of implementing the present techniques, and it can be appreciated that there can be other example architectures.

Figure 12:
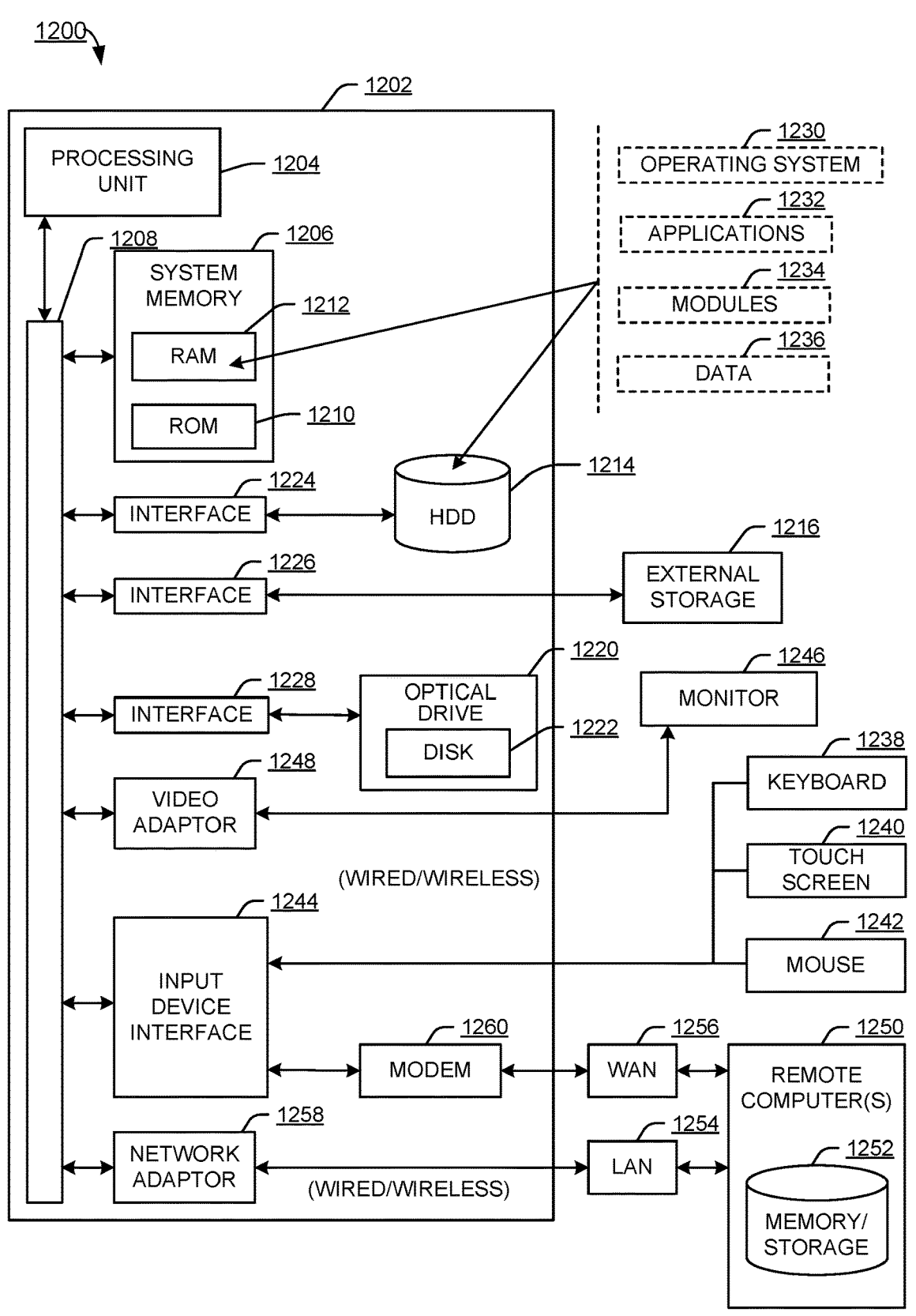
FIG. 12 illustrates an example block diagram of a computer operable to execute an embodiment of this disclosure.

Each of computer system 102 and/or remote computer 106 can be implemented with part(s) of computing environment 1200 of FIG. 12. Communications network 104 can comprise a computer communications network, such as the Internet, or an intranet.

In some examples, meta-tagging based configuration transformation for heterogeneous systems component 108 can facilitate meta-tagging based configuration transformation for heterogeneous systems of computer resources 110. This can involve receiving a request from remote computer 106 to configure computer resources 110, where the request is expressed in a natural language format (e.g., the English language), and uses generic terms to express what is to be performed. Different hardware types can use different terms to convey the idea of those generic terms. Meta-tagging based configuration transformation for heterogeneous systems component 108 can parse the request, determine what specific hardware to use to carry out the request, and convert the request to terms specific to that hardware for carrying out the request.

In some examples, meta-tagging based configuration transformation for heterogeneous systems component 108 can implement part(s) of the process flows of FIGS. 9-11 to implement meta-tagging based configuration transformation for heterogeneous systems.

It can be appreciated that system architecture 100 is one example system architecture for meta-tagging based configuration transformation for heterogeneous systems, and that there can be other system architectures that facilitate meta-tagging based configuration transformation for heterogeneous systems.

FIG. 2 illustrates another example system architecture 200 that can facilitate meta-tagging based configuration transformation for heterogeneous systems, in accordance with an embodiment of this disclosure. In some examples, part(s) of system architecture 200 can be used to implement part(s) of system architecture 100 to facilitate meta-tagging based configuration transformation for heterogeneous systems.

System architecture 200 comprises super spines 202, pods 204, spines 206, leafs 208, servers 210, and meta-tagging based configuration transformation for heterogeneous systems component 212 (which can be similar to meta-tagging based configuration transformation for heterogeneous systems component 108 of FIG. 1).

These components of system architecture 200 can come from a variety of different vendors, where each vendor can use its own terminology to describe seemingly similar network functions. The present techniques can be implemented on a heterogenous system architecture to facilitate a meta-tagging based configuration transformation as described herein.

FIG. 3 illustrates an example 300 of meta-tags that can facilitate meta-tagging based configuration transformation for heterogeneous systems, in accordance with an embodiment of this disclosure. In some examples, part(s) of example 300 can be used to implement part(s) of system architecture 100 to facilitate meta-tagging based configuration transformation for heterogeneous systems.

System architecture 300 comprises meta-tag link aggregation (agg) 302, meta-tag leaf 304, meta-tag link 306, meta-tag spine 308, and meta-tagging based configuration transformation for heterogeneous systems component 310 (which can be similar to meta-tagging based configuration transformation for heterogeneous systems component 108 of FIG. 1).

In system architecture 300 there is a meta-tag (e.g., meta-tag link 306) for various tags (e.g., port, line, interface, link, connection), which facilitates creating one configuration policy file to provision heterogeneous devices in a vendor-agnostic fashion.

To create meta-tags from tags, network functions can be tagged in a latent space using an NLP technique, where meta-tags can group semantically similar terms and phrases together.

FIG. 4 illustrates an example system architecture 400 of a meta-tag based configuration transformation, and that can facilitate meta-tagging based configuration transformation for heterogeneous systems, in accordance with an embodiment of this disclosure. In some examples, part(s) of system architecture 400 can be used to implement part(s) of system architecture 100 to facilitate meta-tagging based configuration transformation for heterogeneous systems.

System architecture 400 comprises desired state configuration 402, tokenization part of speech (POS) tagging named entity recognition/named entity linking (NER/NEL) 404, named entity matching 406, parsing 408, target specific configuration generation 410, meta-tag database 412, and meta-tagging based configuration transformation for heterogeneous systems component 414 (which can be similar to meta-tagging based configuration transformation for heterogeneous systems component 108 of FIG. 1).

The following are details on steps involved in parsing of an input that indicates a desired state, and generating a target specific configuration. A desired state policy (e.g., 402) can be processed line-by-line and fed to a meta-tag parsing stage (e.g., 408). This stage can comprise multiple steps including semantic equivalency assessment using knowledge graph-based monadic second logic. The output of this stage can be sent to a system software model that converts the instructions into target-specific configurations (e.g., 410). A desired state term in natural language can be transformed into multiple different target-device configurations. Details of the Knowledge Graph and semantic equivalence are described below.

FIG. 5 illustrates an example process flow 500 of a meta-tag based configuration transformation, and that can facilitate meta-tagging based configuration transformation for heterogeneous systems, in accordance with an embodiment of this disclosure. In some examples, part(s) of process flow can be used to implement part(s) of system architecture 100 to facilitate meta-tagging based configuration transformation for heterogeneous systems.

Process flow 500 comprises desired state policy 502, meta-tag parsing stage 504, vendor A devices 506, vendor B devices 508, vendor C devices 510, and meta-tagging based configuration transformation for heterogeneous systems component 512 (which can be similar to meta-tagging based configuration transformation for heterogeneous systems component 108 of FIG. 1).

This example process flow 500 illustrates transforming a device-agnostic desired state policy into device-specific configuration using meta-tag-based parsing. Usage for different network devices is presented. Each device has its own notion of the network construct, and hence has a different syntactic structure for configuration.

FIG. 6 illustrates an example of cloud platform constructs 600, and that can facilitate meta-tagging based configuration transformation for heterogeneous systems, in accordance with an embodiment of this disclosure. In some examples, part(s) of cloud platform constructs 600 can be used to implement part(s) of system architecture 100 to facilitate meta-tagging based configuration transformation for heterogeneous systems.

Cloud platform constructs 600 comprises cloud service provider A 602, cloud service provider B 604, cloud service provider C 606, cloud service provider D 608, and meta-tagging based configuration transformation for heterogeneous systems component 610 (which can be similar to meta-tagging based configuration transformation for heterogeneous systems component 108 of FIG. 1).

The present techniques of meta-tagging are not restricted to hardware device configuration. The present techniques can be applied to software configurations, cloud configurations, and other such systems. An example of such an application is that of a cloud resource model, where similar constructs are named differently among various cloud service providers. but effectively mean the same thing.

FIG. 7 illustrates an example of abstraction levels 700, and that can facilitate meta-tagging based configuration transformation for heterogeneous systems, in accordance with an embodiment of this disclosure. In some examples, part(s) of abstraction levels 700 can be used to implement part(s) of system architecture 100 to facilitate meta-tagging based configuration transformation for heterogeneous systems.

Abstraction levels 700 comprises higher abstraction level 702, lower abstraction level 704, configuration variable in node role 706, available values for the variable 708, and meta-tagging based configuration transformation for heterogeneous systems component 710 (which can be similar to meta-tagging based configuration transformation for heterogeneous systems component 108 of FIG. 1).

A formal explanation can be as follows. A Knowledge Graph (KG) can be defined as a directed heterogeneous graph of (configuration) variables and values based on a monadic second order logic as follows: A knowledge graph G is G=$\{N, R\}$ where N is a set of nodes and R is a set of relationships among these nodes.

Each node n in N can be decomposed into another set of nodes. For example, at a higher abstraction level, a specific variable node x1 can be semantically equivalent to a graph at a lower abstraction level which includes a set X1 of element nodes v1, v2, v3 . . .representing the available values for that variable, and a set of relationship rv12, rv23 . . . , which can represent the relationships among these values (e.g., successor with increasing or decreasing values).

FIG. 7 illustrates the knowledge graph. Solid circles represent a node in a graph at a specific abstraction level. Dashed circles represent the semantically equivalent graph at a lower abstraction level, including a set of nodes and a set of relationships among nodes.

In other words, it can be that the concepts of nodes in this knowledge graph are not atomic such that they can be decomposed at a lower abstraction level. To describe such a relationship, nodes and graphs can be called as the roles at specific abstraction levels. This can be why monadic second order logic is used to describe the logic operations.

FIG. 8 illustrates another example of abstraction levels 800, and that can facilitate meta-tagging based configuration transformation for heterogeneous systems, in accordance with an embodiment of this disclosure. In some examples, part(s) of abstraction levels 800 can be used to implement part(s) of system architecture 100 to facilitate meta-tagging based configuration transformation for heterogeneous systems.

Abstraction levels 800 comprises higher abstraction variable 802, lower abstraction level 804, configuration variable in vendor A 806A, configuration variable in vendor B 806B, available values for the variable 808A, available values for the variable 808B, and meta-tagging based configuration transformation for heterogeneous systems component 810 (which can be similar to meta-tagging based configuration transformation for heterogeneous systems component 108 of FIG. 1).

Each r in R at a specific abstraction level can be decomposed as a set of relationships within a single abstraction level, or across different abstraction levels. The following is an example to illustrate how to represent constraints among configuration values with relationships to detect configuration drift.

To illustrate the constraint in configuration values, assume configuration variable x2 in Vendor A's devices corresponds (semantically equivalent) to x1 in Vendor B's devices at a higher abstraction level. At a lower abstraction level, it can be that the value v4 for x2 must be used if v1 or v2 is chosen for x1, and v5 must be used if v3 is chosen for x1.

To explicitly represent such constraints, the decomposition of rx12 between x1 and x2 can be represented at a high abstraction level as rx12v14, rx12v25, and rx12v35, as represented as solid lines in the diagram.

Because the relationship between v1 and v5 does not exist at a lower abstraction level, such violation can be represented as not within the knowledge graph.

Example Process Flows

FIG. 9 illustrates an example process flow 900 that can facilitate meta-tagging based configuration transformation for heterogeneous systems, in accordance with an embodiment of this disclosure. In some examples, one or more embodiments of process flow 900 can be implemented by meta-tagging based configuration transformation for heterogeneous systems component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 1000 of FIG. 10, and/or process flow 1100 of FIG. 11.

Process flow 900 begins with 902, and moves to operation 904.

Operation 904 depicts identifying respective computer function terms utilized by respective vendor equipment of computer function vendors. In some examples, this can comprise creating a knowledge graph. Different computer function terms that different computer providers use can be tagged in a latent space, and clustered, in operations 904-906.

A computer function can relate to computer networking, computer storage, capability of a graphics processing unit (GPU), capability of a data processing unit (DPU), etc.

After operation 904, process flow 900 moves to operation 906.

Operation 906 depicts tagging the respective computer function terms in a latent space based on natural language processing, to produce respective clusters of respective clustered computer function terms.

After operation 906, process flow 900 moves to operation 908.

Operation 908 depicts associating respective metatags with the respective clusters based on respective semantic meanings of the respective clustered computer function terms. Metatags can be added to the clusters of operation 906.

After operation 908, process flow 900 moves to operation 910.

Operation 910 depicts receiving a request to perform a computer function, wherein the request comprises a generic term. That is a request can be received from a user to perform a computer function, where the request is expressed in natural language (e.g., the English language).

In some examples, the request comprises multiple lines of a desired state configuration, and wherein the identifying of the hardware with which to perform the computer function is performed based on parsing the multiple lines on a line-by-line basis. That is, a desired state policy can be processed line-by-line and fed into a metatag parsing stage.

After operation 910, process flow 900 moves to operation 912.

Operation 912 depicts identifying hardware with which to perform the computer function based on the respective metatags. That is, what hardware to use to service the request can be determined.

In some examples, the identifying of the hardware with which to perform the computer function is performed based on a semantic equivalency assessment.

In some examples, the respective clusters of the respective clustered computer function terms comprise a knowledge graph, and the semantic equivalency assessment is performed based on the knowledge graph.

In some examples, the semantic equivalency assessment is performed based on Monadic second order logic.

In some examples, the request identifies a desired state, and operation 912 comprises determining a target-specific configuration for the hardware from an output of the semantic equivalency assessment, wherein the target-specific configuration corresponds to the desired state.

In some examples, the desired state is expressed in a natural language format.

In some examples, the hardware is first hardware, the target-specific configuration is a first target-specific configuration, and operation 912 comprises determining a second target-specific configuration for second hardware from the output of the semantic equivalency assessment, wherein the second target-specific configuration corresponds to the desired state.

This can be implemented similar to FIG. 4, where a desired state policy (e.g., 402) can be processed line-by-line and fed to a meta-tag parsing stage (e.g., 408). This stage can comprise multiple steps including semantic equivalency assessment using knowledge graph-based monadic second logic. The output of this stage can be sent to a system software model that converts the instructions into target-specific configurations (e.g., 410). A desired state term in natural language can be transformed into multiple different target-device configurations.

After operation 912, process flow 900 moves to operation 914.

Operation 914 depicts identifying equipment of a computer function vendor, of the vendor equipment of the respective computer function vendors, which corresponds to the hardware. That is, hardware can us specific types of terms, and this can be determined, After operation 914, process flow 900 moves to operation 916.

Operation 916 depicts based on the respective metatags and the respective clusters, identifying a computer function term of the respective computer function terms used by the equipment of the computer function vendor, wherein the computer function term corresponds to the generic term. That is, specific terms for specific hardware can be determined.

After operation 916, process flow 900 moves to operation 918.

Operation 918 depicts carrying out the request using the hardware with the computer function term. That is, the request of operation 910 that expresses the request in generic terms can be implemented with hardware-specific terms on a specific type of hardware that is available for servicing the request.

After operation 918, process flow 900 moves to 920, where process flow 900 ends.

FIG. 10 illustrates an example process flow 1000 that can facilitate meta-tagging based configuration transformation for heterogeneous systems, in accordance with an embodiment of this disclosure. In some examples, one or more embodiments of process flow 1000 can be implemented by meta-tagging based configuration transformation for heterogeneous systems component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 900 of FIG. 9, and/or process flow 1100 of FIG. 11.

Process flow 1000 begins with 1002, and moves to operation 1004.

Operation 1004 depicts tagging respective computing function terms utilized by respective computing devices of respective computing function providers that provide respective computing functions in a latent space based on natural language processing, to produce respective clusters of respective clustered computing function terms. In some examples, operation 1004 can be implemented in a similar manner as operation 906 of FIG. 9.

In some examples, the computing function comprises a first configuration function applicable to configuring a hardware device, a second configuration function applicable to configuring computer software, or a third configuration function applicable to configuring a cloud platform. That is, the present techniques can be applied hardware device configuration, as well as to software configurations, cloud configurations, to other systems.

After operation 1004, process flow 1000 moves to operation 1006.

Operation 1006 depicts associating respective metatags with the respective clusters based on respective semantic meanings of the respective clustered computing function terms. In some examples, operation 1006 can be implemented in a similar manner as operation 908 of FIG. 9.

After operation 1006, process flow 1000 moves to operation 1008.

Operation 1008 depicts receiving a request to perform a computing function of the respective computing functions, wherein the request comprises a generic term. In some examples, operation 1008 can be implemented in a similar manner as operation 910 of FIG. 9.

In some examples, the request identifies a desired state, and operation 1008 comprises determining a target-specific configuration for the computing resource from the desired state based on performing at least one of tokenization, part-of-speech tagging, named entity recognition, or named entity linking on the desired state. This can be similar to desired state configuration 402, and tokenization part of speech (POS) tagging named entity recognition/named entity linking (NER/NEL) 404 of FIG. 4.

In some examples, performing the at least one of the tokenization, the part-of-speech tagging, the named entity recognition, or the named entity linking produces a tokenized desired state, and operation 1008 comprises performing the named entity matching on the tokenized desired state using a datastore that identifies the respective metatags. This datastore can be similar to meta-tag database 412 of FIG. 4.

In some examples, performing the named entity matching produces a named entity matched tokenized desired state, and operation 1008 comprises parsing the named entity matched tokenized desired state. This can be similar to parsing 408 of FIG. 4.

After operation 1008, process flow 1000 moves to operation 1010.

Operation 1010 depicts identifying a computing resource with which to perform the computing function based on the respective metatags. In some examples, operation 1010 can be implemented in a similar manner as operation 912 of FIG. 9.

After operation 1010, process flow 1000 moves to operation 1012.

Operation 1012 depicts identifying at least one computing device of a computing function provider, of the respective computing devices of the respective computing function providers, which corresponds to the computing resource. In some examples, operation 1012 can be implemented in a similar manner as operation 914 of FIG. 9.

After operation 1012, process flow 1000 moves to operation 1014.

Operation 1014 depicts based on the respective metatags and the respective clusters, identifying a computing function term of the respective computing function terms used by the at least one computing device of the computing function provider, wherein the computing function term corresponds to the generic term. In some examples, operation 1014 can be implemented in a similar manner as operation 916 of FIG. 9.

After operation 1014, process flow 1000 moves to operation 1016.

Operation 1016 depicts performing the request on the computing resource with the computing function term. In some examples, operation 1016 can be implemented in a similar manner as operation 918 of FIG. 9.

After operation 1016, process flow 1000 moves to 1018, where process flow 1000 ends.

FIG. 11 illustrates an example process flow 1100 that can facilitate meta-tagging based configuration transformation for heterogeneous systems, in accordance with an embodiment of this disclosure. In some examples, one or more embodiments of process flow 1100 can be implemented by meta-tagging based configuration transformation for heterogeneous systems component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 900 of FIG. 9, and/or process flow 1000 of FIG. 10.

Process flow 1100 begins with 1102, and moves to operation 1104.

Operation 1104 depicts clustering respective computer function terms utilized by respective computer function provider computing equipment, to produce respective clusters of respective clustered computer function terms. In some examples, operation 1104 can be implemented in a similar manner as operation 906 of FIG. 9.

In some examples, the respective clusters of the respective clustered computer function terms comprise a knowledge graph, and the knowledge graph comprises a directed heterogenous graph of variables and values. That is, a knowledge graph can comprise a directed heterogeneous graph of (configuration) variables and values based on Monadic Second order logic.

In some examples, the knowledge graph comprises a group of nodes and a group of interrelationships within the group of nodes. That is, a knowledge graph G can be G={N, R} where N is a set of nodes and R is a set of relationships among these nodes.

In some examples, the group of nodes is a first group of nodes, and a node of the first group of nodes comprises a second group of nodes.

In some examples, the knowledge graph comprises a first abstraction level and a second abstraction level, the first abstraction level comprises a variable node, the second abstraction level comprises a group of element nodes, and the variable node is semantically equivalent to the group of element nodes. In some examples, respective element nodes of the group of element nodes identify respective available values for a variable represented by the variable node. In some examples, the second abstraction level comprises a group of relationships between respective element nodes of the group of element nodes.

That is, each node n in N can be decomposed into another set of nodes. For example, at a higher abstraction level, a specific variable node xl can be semantically equivalent to a graph at a lower abstraction level which includes a set XI of element nodes v1, v2, v3 . . . representing the available values for that variable, and a set of relationship rv12, rv23 . . . , which can represent the relationships among these values (e.g., successor with increasing or decreasing values).

After operation 1104, process flow 1100 moves to operation 1106.

Operation 1106 depicts associating respective metatags with the respective clusters. In some examples, operation 1106 can be implemented in a similar manner as operation 908 of FIG. 9.

After operation 1106, process flow 1100 moves to operation 1108.

Operation 1108 depicts receiving a request to perform a computer function. In some examples, operation 1108 can be implemented in a similar manner as operation 910 of FIG. 9.

After operation 1108, process flow 1100 moves to operation 1110.

Operation 1110 depicts identifying a computer resource with which to perform the computer function based on the respective metatags. In some examples, operation 1110 can be implemented in a similar manner as operation 912 of FIG. 9.

After operation 1110, process flow 1100 moves to operation 1112.

Operation 1112 depicts identifying computer function provider computing equipment of the respective computer function provider computing equipment that corresponds to the computer resource. In some examples, operation 1112 can be implemented in a similar manner as operation 914 of FIG. 9.

After operation 1112, process flow 1100 moves to operation 1114.

Operation 1114 depicts based on the respective metatags and the respective clusters, identifying a computer function term of the respective computer function terms used by the computer function provider computing equipment, wherein the computer function term corresponds to a generic term identified in the request. In some examples, operation 1114 can be implemented in a similar manner as operation 916 of FIG. 9.

After operation 1114, process flow 1100 moves to operation 1116.

Operation 1116 depicts performing the request on the computer resource with the computer function term. In some examples, operation 1116 can be implemented in a similar manner as operation 918 of FIG. 9.

After operation 1116, process flow 1100 moves to 1118, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of computer system 102, and/or remote computer 106.

In some examples, computing environment 1200 can implement one or more embodiments of the process flows of FIGS. 9-11 to facilitate meta-tagging based configuration transformation for heterogeneous systems.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 (containing disk 1222) can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the. NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:

at least one processor; and at least one memory that stores executable instructions that, when executed by the at least one processor, facilitate performance of operations, comprising:

identifying respective computer function terms utilized by respective vendor equipment of computer function vendors;

tagging the respective computer function terms in a latent space based on natural language processing, to produce respective clusters of respective clustered computer function terms;

associating respective metatags with the respective clusters based on respective semantic meanings of the respective clustered computer function terms;

receiving a request to perform a computer function, wherein the request comprises a generic term;

identifying hardware with which to perform the computer function based on the respective metatags;

identifying equipment of a computer function vendor, of the respective vendor equipment of the computer function vendors, which corresponds to the hardware;

based on the respective metatags and the respective clusters, identifying a computer function term of the respective computer function terms used by the equipment of the computer function vendor, wherein the computer function term corresponds to the generic term; and carrying out the request using the hardware with the computer function term.

2. The system of claim 1, wherein the request comprises multiple lines of a desired state configuration, and wherein the identifying of the hardware with which to perform the computer function is performed based on parsing the multiple lines on a line-by-line basis.

3. The system of claim 1, wherein the identifying of the hardware with which to perform the computer function is performed based on a semantic equivalency assessment.

4. The system of claim 3, wherein the respective clusters of the respective clustered computer function terms comprise a knowledge graph, and wherein the semantic equivalency assessment is performed based on the knowledge graph.

5. The system of claim 3, wherein the semantic equivalency assessment is performed based on Monadic second order logic.

6. The system of claim 3, wherein the request identifies a desired state, and wherein the operations further comprise:

determining a target-specific configuration for the hardware from an output of the semantic equivalency assessment, wherein the target-specific configuration corresponds to the desired state.

7. The system of claim 6, wherein the desired state is expressed in a natural language format.

8. The system of claim 6, wherein the hardware is first hardware, wherein the target-specific configuration is a first target-specific configuration, and wherein the operations further comprise:

determining a second target-specific configuration for second hardware from the output of the semantic equivalency assessment, wherein the second target-specific configuration corresponds to the desired state.

9. A method, comprising:

tagging, by a system comprising at least one processor, respective computing function terms utilized by respective computing devices of respective computing function providers, wherein the respective computing devices provide respective computing functions in a latent space based on natural language processing, to produce respective clusters of respective clustered computing function terms;

associating, by the system, respective metatags with the respective clusters based on respective semantic meanings of the respective clustered computing function terms;

receiving, by the system, a request to perform a computing function of the respective computing functions, wherein the request comprises a generic term;

identifying, by the system, a computing resource with which to perform the computing function based on the respective metatags;

identifying, by the system, at least one computing device of a computing function provider, of the respective computing devices of the respective computing function providers, which corresponds to the computing resource;

based on the respective metatags and the respective clusters, identifying, by the system, a computing function term of the respective computing function terms used by the at least one computing device of the computing function provider, wherein the computing function term corresponds to the generic term; and performing, by the system, the request on the computing resource with the computing function term.

10. The method of claim 9, wherein the request identifies a desired state, and further comprising:

determining, by the system, a target-specific configuration for the computing resource from the desired state based on performing at least one of tokenization, part-of-speech tagging, named entity recognition, or named entity linking on the desired state.

11. The method of claim 10, wherein performing the at least one of the tokenization, the part-of-speech tagging, the named entity recognition, or the named entity linking produces a tokenized desired state, and further comprising:

performing, by the system, named entity matching on the tokenized desired state using a datastore that identifies the respective metatags.

12. The method of claim 11, wherein performing the named entity matching produces a named entity matched tokenized desired state, and further comprising:

parsing, by the system, the named entity matched tokenized desired state.

13. The method of claim 9, wherein the computing function comprises a first configuration function applicable to configuring a hardware device, a second configuration function applicable to configuring computer software, or a third configuration function applicable to configuring a cloud platform.

14. A non-transitory computer-readable medium comprising instructions that, in response to execution, cause a system comprising at least one processor to perform operations, comprising:

clustering respective computer function terms utilized by respective computer function provider computing equipment, to produce respective clusters of respective clustered computer function terms;

associating respective metatags with the respective clusters;

receiving a request to perform a computer function;

identifying a computer resource with which to perform the computer function based on the respective metatags;

identifying computer function provider computing equipment of the respective computer function provider computing equipment that corresponds to the computer resource;

based on the respective metatags and the respective clusters, identifying a computer function term of the respective computer function terms used by the computer function provider computing equipment, wherein the computer function term corresponds to a generic term identified in the request; and performing the request on the computer resource with the computer function term.

15. The non-transitory computer-readable medium of claim 14, wherein the respective clusters of the respective clustered computer function terms comprise a knowledge graph, and wherein the knowledge graph comprises a directed heterogenous graph of variables and values.

16. The non-transitory computer-readable medium of claim 15, wherein the knowledge graph comprises a group of nodes and a group of interrelationships within the group of nodes.

17. The non-transitory computer-readable medium of claim 16, wherein the group of nodes is a first group of nodes, and wherein a node of the first group of nodes comprises a second group of nodes.

18. The non-transitory computer-readable medium of claim 15, wherein the knowledge graph comprises a first abstraction level and a second abstraction level, wherein the first abstraction level comprises a variable node, wherein the second abstraction level comprises a group of element nodes, and wherein the variable node is semantically equivalent to the group of element nodes.

19. The non-transitory computer-readable medium of claim 18, wherein respective element nodes of the group of element nodes identify respective available values for a variable represented by the variable node.

20. The non-transitory computer-readable medium of claim 18, wherein the second abstraction level comprises a group of relationships between respective element nodes of the group of element nodes.

* * * * *